US011663620B2

United States Patent
Maiman et al.

(10) Patent No.: US 11,663,620 B2
(45) Date of Patent: *May 30, 2023

(54) CUSTOMIZED MERCHANT PRICE RATINGS

(71) Applicant: Capital One Services, LLC, McLean, VA (US)

(72) Inventors: Tyler Maiman, Melville, NY (US); Kathryn Tikoian, Arlington, VA (US); Phoebe Atkins, Rockville, VA (US)

(73) Assignee: Capital One Services, LLC, McLean, VA (US)

( * ) Notice: Subject to any disclaimer, the term of this patent is extended or adjusted under 35 U.S.C. 154(b) by 104 days.

This patent is subject to a terminal disclaimer.

(21) Appl. No.: 17/369,358

(22) Filed: Jul. 7, 2021

(65) Prior Publication Data

US 2023/0010964 A1 Jan. 12, 2023

(51) Int. Cl.
*G06Q 30/02* (2023.01)
*G06Q 30/0201* (2023.01)
*G06N 20/00* (2019.01)
*G06Q 30/0601* (2023.01)

(52) U.S. Cl.
CPC ........ *G06Q 30/0206* (2013.01); *G06N 20/00* (2019.01); *G06Q 30/0625* (2013.01); *G06Q 30/0629* (2013.01); *G06Q 30/0641* (2013.01)

(58) Field of Classification Search
None
See application file for complete search history.

(56) References Cited

U.S. PATENT DOCUMENTS

| | | | |
|---|---|---|---|
| 10,339,548 B1 * | 7/2019 | Kumar | G06Q 20/20 |
| 10,885,039 B2 | 1/2021 | Hornkvist et al. | |
| 2010/0306192 A1 * | 12/2010 | Kapur | G06F 16/9535 |
| | | | 707/723 |
| 2012/0036073 A1 * | 2/2012 | Basu | G06Q 20/42 |
| | | | 705/44 |
| 2012/0072264 A1 * | 3/2012 | Perna | G06Q 30/0203 |
| | | | 705/7.29 |
| 2013/0080364 A1 | 3/2013 | Wilson et al. | |

(Continued)

OTHER PUBLICATIONS

Wang (Yi-Hsien Wang, Nonlinear neural network forecasting model for stock index option price: Hybrid GJR-GARCH approach, Expert Systems with Applications, vol. 36, Issue 1, Jan. 2009, pp. 564-570).*

(Continued)

*Primary Examiner* — Matthew D Henry
(74) *Attorney, Agent, or Firm* — Banner & Witcoff, Ltd.

(57) ABSTRACT

Aspects described herein may allow for generating a customized price rating using a machine learning algorithm. This may have the effect of improving the display of information about merchants by including customized, personalized price ratings that better reflect the tastes and preferences of a user or group of users. According to some aspects, these and other benefits may be achieved by using a machine learning model, trained to receive input corresponding to both user data and merchant data and output an indication of customized price rating(s) for the merchant that is specific to one or more users, and then to generate information about the merchant for display that includes the customized price rating(s).

20 Claims, 5 Drawing Sheets

(56) References Cited

U.S. PATENT DOCUMENTS

| | | | |
|---|---|---|---|
| 2013/0090959 A1* | 4/2013 | Kvamme | G06Q 10/02 |
| | | | 705/5 |
| 2014/0136264 A1* | 5/2014 | Kinsey, II | G06Q 30/0282 |
| | | | 705/7.19 |
| 2015/0186951 A1* | 7/2015 | Wilson | G06Q 30/0269 |
| | | | 705/14.66 |
| 2016/0358268 A1* | 12/2016 | Verma | G06N 20/10 |
| 2017/0323402 A1 | 11/2017 | Fishberg | |
| 2019/0340537 A1 | 11/2019 | Fung et al. | |
| 2020/0372823 A1* | 11/2020 | Edwards | G09B 19/18 |
| 2021/0056385 A1* | 2/2021 | Mane | G06N 3/045 |

OTHER PUBLICATIONS

Yi-Hsien Wang "Nonlinear neural network forecasting model for stock index option price: Hybrid GJR-GARCH approach" Department of Finance, Yuanpei University, Expert Systems with Applications, vol. 36, Issue 1, Jan. 2009, pp. 564-570.

Sep. 27, 2022—(WO) International Search Report and Written Opinion—PCT/US2022/035903.

* cited by examiner

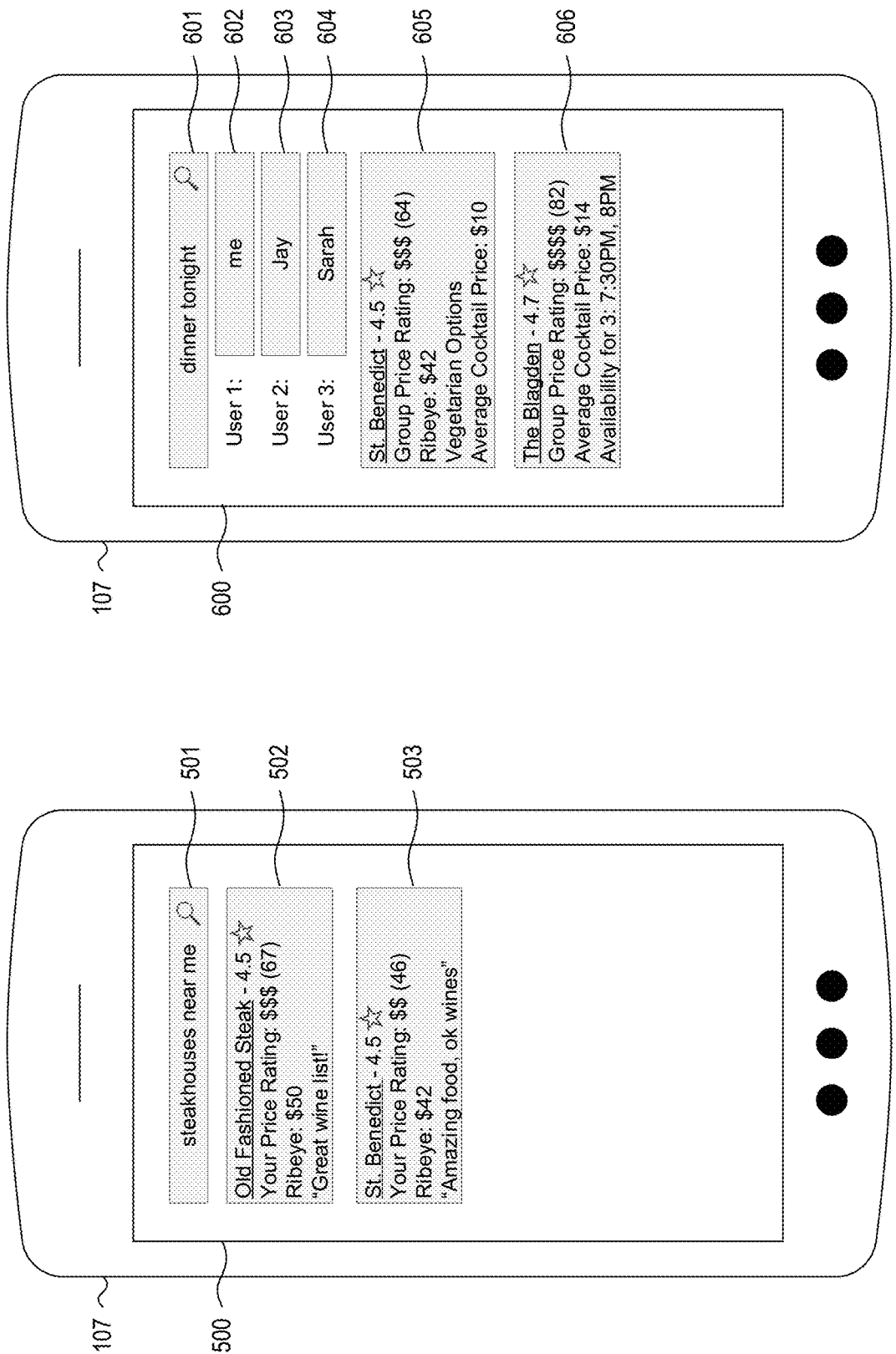

CUSTOMIZED MERCHANT PRICE RATINGS

FIELD OF USE

Aspects of the disclosure relate generally to search and information systems and more specifically to systems that customize search results by personalizing search entity information using a machine learning algorithm.

BACKGROUND

Search and information systems provide a vast quantity of data about different entities that users may search for, such as businesses and other merchants. Users spend increasing amounts of time perusing this data to determine which businesses they would like to patronize. In many cases, the large amount of data presented may make the task of selecting a merchant more difficult, in part because of the presence of user and other reviews that may present conflicting information. Additionally, these problems are only compounded when a group of users is trying to find a merchant that will best satisfy all of the users' preferences. As a result, there is significant computational waste: volumes of data is collected and transmitted, and yet only a fraction of that data is in fact useful for a user. There is a need for an ability to improve the retrieval, processing, and display of such data in a manner that preserves such computational resources while providing users quicker and better decisions without getting lost in the large quantity of available information.

Aspects described herein may address these and other problems, and generally improve the quality, efficiency, and speed of presenting customized information about merchants for users.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Aspects described herein may allow for generating a customized price rating using a machine learning algorithm. This may have the effect of improving the retrieval, processing, and display of information about merchants by including customized, personalized price ratings that better reflect the tastes and preferences of a user or group of users. According to some aspects, these and other benefits may be achieved by using a machine learning model, trained to receive input corresponding to both user data and merchant data and output an indication of a customized price rating for the merchant that is specific to the user, and then to generate information about the merchant for display that includes the customized price rating.

More particularly, some aspects described herein may provide a computer-implemented method for generating and displaying customized price ratings. The method may comprise retrieving, by a computing device, a training data set and training a machine learning model to output a customized price rating based on input data indicating at least one or more product costs for the particular merchant and a spending habit for a particular user. The computing device may, after training the machine learning model, receive a query from a user, identifying one or more merchants matching the query, and generate inputs for the machine learning model based on the user and merchant data in order to generate a customized price indicator. The customized price indicator may indicate a comparison of an average cost of the first merchant relative to an average past expenditure, by the first user, at one or more different merchants. The computing device may then cause display of the customized price indicator.

In some embodiments, the user data may be stored in a user profile, which the computing device may retrieve by determining a merchant category for a merchant, and may filter based on the merchant category to determine spending habit data for the user that is relevant to the merchant. Additionally and/or alternatively, the computing device may predict one or more goods or services that the user will purchase, and the cost of the one or more goods may be used as input to the machine learning model. In some cases, the computing device may also predict a time period when the first user will purchase a good or service from the first merchant, and may filter the user profile to determine a spending habit for the time period. The computing device may also determine when a customized price indicator satisfies a threshold, and may then cause display of an indication of other merchants.

Some aspects described herein also may provide a computer-implemented method for generating and displaying customized price ratings for a group of users. The method may comprise receiving data from a client device, the data including an indication of one or more merchants and a plurality of identifiers for a plurality of users in a group. The computing device may then retrieve merchant data for the one or more merchants that indicates at least one cost associated with the corresponding merchant. The computing device may then determine a group price indicator for each merchant by determining spending habit data for each user of the group, provide the merchant data and spending habit to generate a customized price indicator for each merchant-user pairing, and combine the user-specific customized price indicators for a merchant in order to generate a group price indicator for each merchant. The computing device may then cause display of group price indicators generated for each merchant.

In some embodiments, the computing device may also cause display of user-specific customize price indicator along with the group price indicator, for example if the first customized price indicator satisfies a threshold. Additionally and/or alternatively, the computing device may determine additional merchants associated with a lower average price and cause display of indication(s) of the additional merchants. The computing device may also predict one or more goods or services that the group will purchase, and the cost of the one or more goods may be used as input to the machine learning model. In some cases, the computing device may predict a time period when the group will purchase a good or service from the first merchant, and may filter the spending habit data to determine a spending habit for the time period. In some cases, the computing device may also determine that a merchant has availability for the group based on the plurality of identifiers.

These features, along with many others, are discussed in greater detail below.

BRIEF DESCRIPTION OF THE DRAWINGS

The present disclosure is described by way of example and not limited in the accompanying figures in which like reference numerals indicate similar elements and in which:

FIGS. 5-6 show example user interfaces for accessing a search system that generates and displays customized price ratings according to one or more aspects of the disclosure.

DETAILED DESCRIPTION

Figure 1:
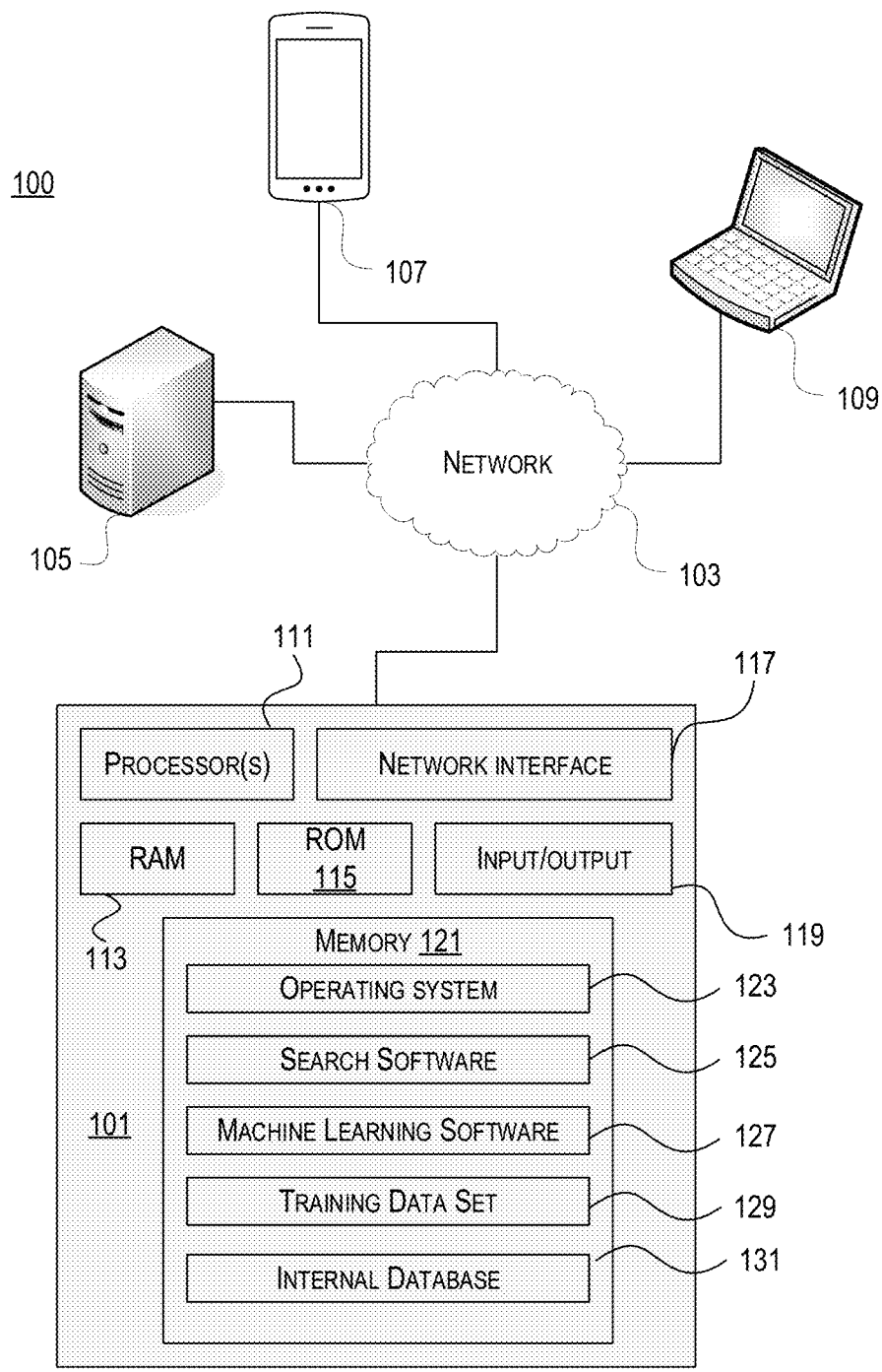
FIG. 1 shows an example of a control processing system in which one or more aspects described herein may be implemented.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques for generating and displaying customized price ratings using machine learning techniques. Search and other information systems that provide information about merchants may include a price rating that indicates whether a particular merchant is more or less expensive. These price ratings may occur in the form of ratings (e.g., in the United States, "$" for inexpensive, "$$" for slightly more expensive, "$$$" for still more expensive, "$$$$" for most expensive, etc.) or numerical scores, which may be generated based on customer reviews or by other third parties. However, this information may represent the particular opinion of a certain third party, or an average opinion of different customers, which may not reflect the personal opinion of a potential customer or group of customers. As such, although the collection of this data might be time-consuming, and significant resources may need to be devoted to storing this data and processing it (especially for large-scale systems), this data still might not be useful for a user.

Among other features, the methods and systems described below improve on this situation by generating and causing display of customized price ratings that may better reflect the personal opinion of the user at issue, avoiding the significant computational and storage waste inherent in collecting, processing, and displaying unhelpful price ratings. Instead of showing a price rating determined by a third-party reviewer or by averaging the reviews of many users (e.g., who may or might not have similar tastes as compared to the user at issue), the system may generate a customized price indicator that takes into account the costs of items (e.g., goods or services) provided by the merchant as well as spending habit data for a user or group of users. Thus, by tailoring the price rating to a particular user's or group's spending habits, the system may provide a price rating that better reflects the opinion of the particular user or group of users, thereby avoiding the computational waste inherent in providing non-helpful information to the particular user or groups of users. In this way, for example, the system may display information about a particular merchant, such as a restaurant, with a customized price rating indicating a high cost (e.g. "$$$$") for a first user (e.g., a student), whereas it may display the same restaurant with a customized price rating indicating a lower cost (e.g., "$$") for a second user with different preferences and spending habits (e.g., an executive who regularly dines at expensive restaurants). Similarly, the system may display higher customized price ratings for a first group than for a second group that typically spends relatively more at a particular kind of merchant.

The system may also provide filtering and tailoring in order to better collect, process, and provide price rating data in a manner which targets and customizes the price rating without waste of computing resources. For example, the system may filter user transaction data to determine relevant transactions indicative of spending at a particular type of merchant (e.g., filtering a user's transactions to observe how much the user typically spends at a steakhouse in order to generate a customized price rating for a steakhouse). As another example, the system may filter user transaction data based on a predicted time at which a user will patronize a merchant (e.g., it may determine and use an evening spending habit to calculate a customized price rating for a merchant that will be visited in the evening). Additionally and/or alternatively, the system may predict items that user will purchase (e.g., a dish that a user will order at a restaurant), and this information may be used to tailor the customized price rating (e.g., by providing the cost of predicted dish as input to the machine learning model) and any displayed search result (e.g., by displaying the cost of the predicted dish along with other information about the restaurant). In all examples, by performing this filtering, the system reduces the volume of data considered for a particular price rating, which may preserve computing resources. For example, by ignoring and/or filtering user review before generating a customized review, the processing resources required to transmit and/or process those reviews into a price rating are significantly lessened.

The techniques described herein improve the functioning of computers by improving on search and information systems by, e.g., improving the processing efficiency of such systems, improving the accuracy and utility of data processed by such systems. As already detailed above, conventional search and information systems often collect, process, and display data that might not be useful to a user, thereby spending significant computing resources to provide useless information. These features, and the other features described below, thus represent an advancement to the art of search and information retrieval, in effect lowering the likelihood that such computing resources will be wasted. Techniques described below also provide for efficiently deploying the customization feature in search systems that may be configured to search and display information about large numbers of merchants.

FIG. 1 shows a system 100. The system 100 may include a plurality of devices including a search system 101, a plurality of client devices (e.g., mobile device 107, computing device 109), and/or third party data server(s) 105 in communication via a network 103. It will be appreciated that the network connections shown are illustrative and any means of establishing a communications link between the devices may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies.

Client devices (e.g., mobile device 107, computing device 109) may be user devices that may send queries or other requests for information about merchants to the search system 101 as described herein. The third party data system (s) may include databases of information that may be accessed by the search system 101 as described herein. Databases may include, but are not limited to relational databases, hierarchical databases, distributed databases, in-memory databases, flat file databases, XML databases, NoSQL databases, graph databases, and/or a combination thereof. The search system 101 may receive queries, identify one or more merchants matching the query, generate user-customized ratings for the one or more merchants, and return the user-customized ratings to the client devices as described herein. The network 103 may include a local area network (LAN), a wide area network (WAN), a wireless telecommunications network, and/or any other communication network or combination thereof.

The data transferred to and from various computing devices in a system 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in the system 100 in front of one or more computing devices such that any external devices may communicate directly with the specialized hardware.

The search system 101 may be used to implement one or more of the techniques described herein. The search system 101 may include one or more processor(s) 111 for controlling overall operation of the search system 101 and its associated components, including RAM 113, ROM 115, input/output device 119, network interface 117, and/or memory 121. A data bus may interconnect processor(s) 111, RAM 113, ROM 115, memory 121, I/O device 119, and/or network interface 117. In some embodiments, the search system 101 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Software may be stored within memory 121 to provide instructions to processor(s) 111 to allow the search system 101 to perform various actions. For example, memory 121 may store software used by the search system 101, such as an operating system 123, software such as search software 125 and/or a machine learning software 127, and an associated internal database 131. The various hardware memory units in memory 121 may include volatile and nonvolatile, removable and non-removable media implemented in any method or technology for storage of information such as computer-readable instructions, data structures, program modules, or other data. Memory 121 may include one or more physical persistent memory devices and/or one or more non-persistent memory devices. Memory 121 may include, but is not limited to, random access memory (RAM) 113, read only memory (ROM) 114, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor(s) 111.

Network interface 117 may include one or more transceivers, digital signal processors, and/or additional circuitry and software for communicating via any network, wired or wireless, using any protocol as described herein.

The processor(s) 111 may include a single central processing unit (CPU), which may be a single-core or multi-core processor, or may include multiple CPUs. The processor(s) 111 and associated components may allow the search system 101 to execute a series of computer-readable instructions to perform some or all of the processes described herein. Although not shown in FIG. 1, various elements within memory 121 or other components in search system 101 may include one or more caches, for example, CPU caches used by the processor(s) 111, page caches used by the operating system 123, disk caches of a hard drive, and/or database caches used to cache content from database 131. For embodiments including a CPU cache, the CPU cache may be used by one or more processors 111 to reduce memory latency and access time. A processor 111 may retrieve data from or write data to the CPU cache rather than reading/writing to memory 121, which may improve the speed of these operations. In some examples, a database cache may be created in which certain data from a database 131 is cached in a separate smaller database in a memory separate from the database, such as in RAM 113 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of the search system 101 are described separately, functionality of the various components may be combined and/or performed by a single component and/or multiple computing devices in communication without departing from the invention.

The client devices (e.g., mobile device 107, computing device 109), the third party data server(s) 105, and/or other devices (not shown) may have similar or different architecture as described with respect to search system 101. Those of skill in the art will appreciate that the functionality of search system 101 (or the mobile device 107, computing device 109, and/or third party data server(s) 105) as described herein may be spread across multiple data processing devices, for example, to distribute processing load across multiple computers, to segregate transactions based on geographic location, user access level, quality of service (QoS), etc. For example, the search system 101, the third-party data server(s) 105, the mobile device 107, the computing device 109, and/or other devices (not shown) may operate in concert to provide parallel computing features in support of the operation of search software 125 and/or machine learning software 127.

Figure 2:
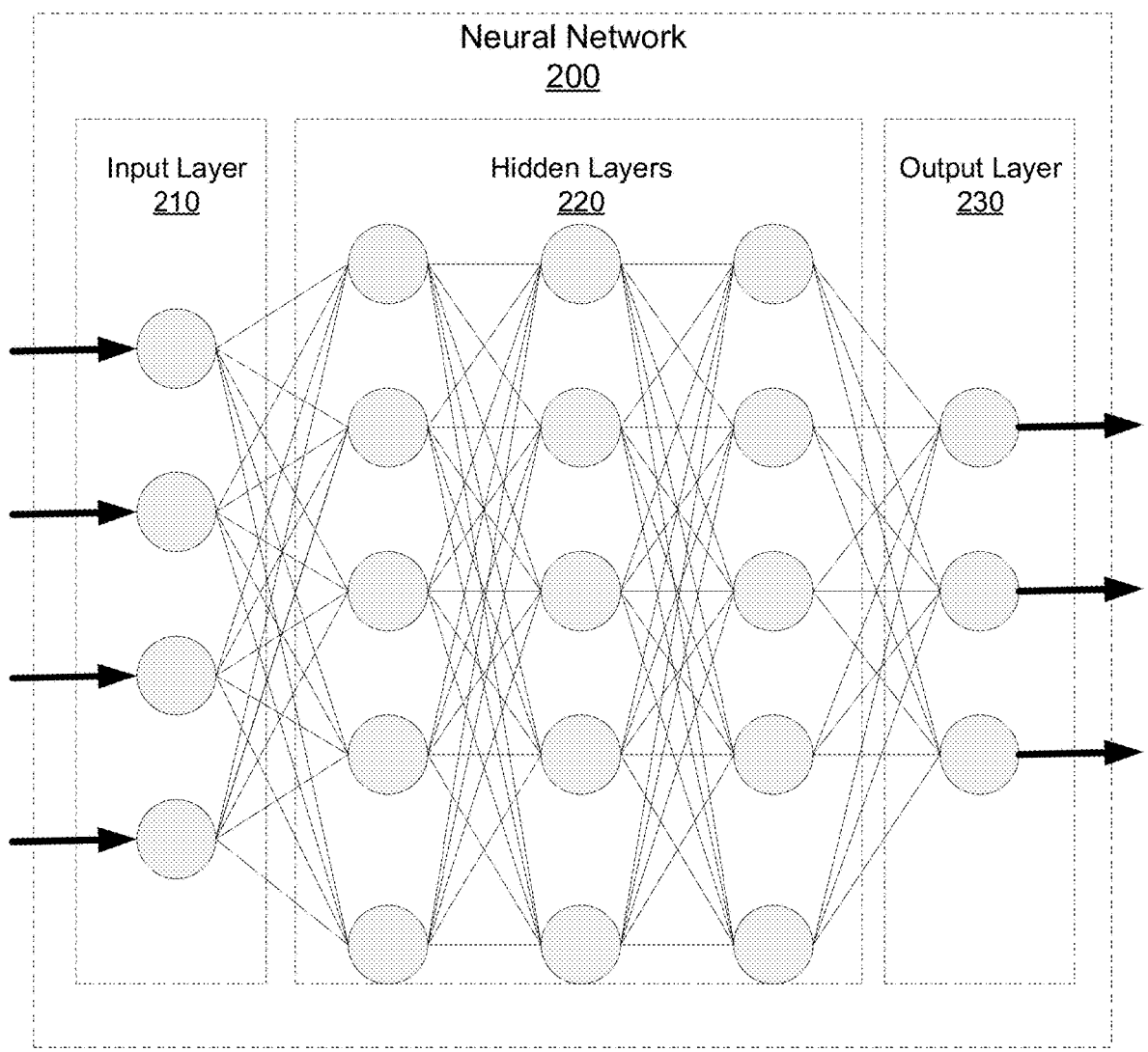
FIG. 2 shows an example of a neural network architecture in accordance with one or more aspects described herein.

FIG. 2 illustrates an example neural network architecture 200, which may be used to implement the customized price rating machine learning model described herein. An artificial neural network, such as the neural network architecture 200, may be a collection of connected nodes, with the nodes and connections each having assigned weights used to generate predictions. Each node in the artificial neural network may receive input and generate an output signal. The output of a node in the artificial neural network may be a function of its inputs and the weights associated with the edges. Ultimately, the trained model may be provided with input beyond the training data set 129 and used to generate predictions regarding the likely results. For example, as discussed below, the customized price rating machine learning model may be provided a training data set 129 which trains the risk detection machine learning model to generate a customized price rating based on various inputs.

An artificial neural network may have an input layer 210, one or more hidden layers 220, and an output layer 230. A neural network may have more than one hidden layer. Illustrated network architecture 200 is depicted with three hidden layers. The number of hidden layers employed in the neural network 200 may vary based on the particular application and/or problem domain. Similarly, the number of input and/or output nodes may vary based on the application. Many types of neural networks are used in practice, such as convolutional neural networks, recurrent neural networks, feed forward neural networks, combinations thereof, and others.

During the machine learning model training process, machine learning software 127 may adjust the weights of each connection and/or node in a learning process as the machine learning model adapts to generate more accurate predictions on a training data set 129. The weights assigned to each connection and/or node may be referred to as the machine learning model parameters. The model may be initialized with a random or white noise set of initial model parameters. The model parameters may then be iteratively adjusted using, for example, stochastic gradient descent algorithms that seek to minimize errors in the machine learning model. As described below with respect to step 302 of FIG. 3, the trained model may be used to implement a customized rating for a search process.

Figure 3:
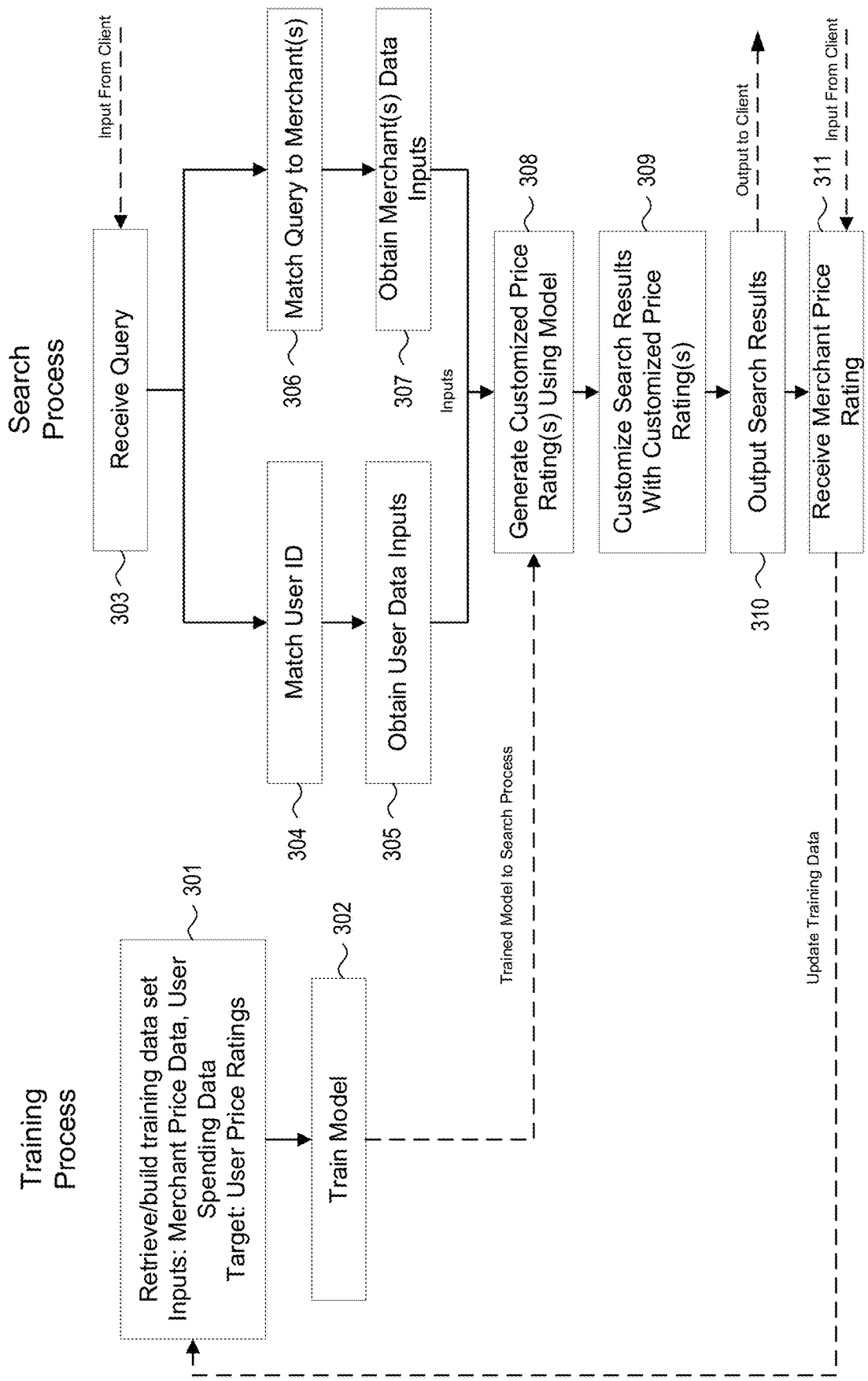
FIG. 3 shows a flow chart of a process for generating and displaying customized price ratings according to one or more aspects of the disclosure.

FIG. 3 illustrates steps of a training process (steps 301-302) and steps of a search process (steps 303-311), either or both of which may be executed by the search system 101. The search system 101 may use the training process to train and/or re-train a machine learning model that is used in the search process, and therefore the training process may occur prior to receiving a search query. The search system 101 may also re-train a machine learning model using the training process based on data obtained via execution of the search process, and therefore the training process may be re-executed at any time.

At step 301, the search system 101 may retrieve and/or build a training data set (e.g., the training data set 129) for training a machine learning model. The training data set may correlate one or more types of input data with target output data for the machine learning model so that the search system 101 may train a machine learning model using a supervised learning process. For example, the training data set may include a plurality of entries, each correlating input data comprising merchant data and/or user data (e.g., data indicating a user spending habit) with output or "target" data such as a customized user price rating. Additionally and/or alternatively, the training data set may not include output data, and the search system 101 may train a machine learning model using an unsupervised learning process. Prior to or as part of step 301, the search system 101 may process data to generate data for the training data set. For example, the search system 101 may convert a format of the data to a format usable to generate a machine learning model.

The training data set may include training inputs that indicate information about a particular user. For example, the training user data may include transaction data for previous transactions of a particular user at various merchants. This data may be referred to as spending habit data because it indicates one or more user spending habits. The data may include, for each of a plurality of transactions, an amount spent, a name or identity of the merchant on the other side of the transaction, one or more types of the merchant (e.g., a type of cuisine served by a restaurant, a type of location of the merchant, a type of service provided by the merchant, etc.). The transaction data may also include details about what types of items were purchased (e.g., what dishes and/or drinks were purchased from a restaurant). The transaction data may additionally and/or alternatively include subjective information about the purchase, such as whether the user thought a purchase was worth the money. This transaction data may be processed by the search system 101 to generate one or more inputs for the training data set. As one example, the search system 101 may process the transaction data to determine an average price spent by a particular user of the training data set at restaurants, a standard deviation of the average price for the user, a highest amount spent by the particular user at restaurants, an average amount spent by the user at a particular type of restaurant (e.g., at steakhouses), a favorite (e.g., most common) dish ordered by a user at a restaurant, an indication of whether the user commonly orders wine at a restaurant, and/or other similar indications that may be derived from the transaction data described above.

Other transaction data may also be processed to determine relevant information about a particular user. For example, the search system 101 may process transactions involving a specialty wine distributor to determine whether a user likes wine, an average amount that a user prefers to spend on a bottle of wine, and the like. As another example, the search system 101 may categorize all transactions for a particular user (e.g., a user appearing in the training data set). As more specific examples, a first transaction may be categorized as a "clothing" transaction, a second transaction may be categorized as a particular type of restaurant (e.g., a fancy restaurant), and a third transaction may be categorized as a different type of restaurant (e.g., a takeout restaurant).

The search system 101 may process user transaction data to determine one or more spending habits of a user over time, which may be used in the training data set. For example, a user might be more prone to spending more money at a restaurant on weekends as compared to during the week. Thus, the search system 101 may generate a vector indicating a user's average spending per day of week, for example, and provide the vector as an input for the particular user in the training data set. As another example, a user might spend more on clothing in the summer than they do in the winter. Thus, the search system 101 may generate a vector indicating a user's average spending for different seasons, and provide the vector as an input for the particular user in the training data set. As another example, a user might be willing to spend more at certain types of restaurants than others, and thus the search system 101 may generate a vector indicating a user's average spending at different categories of restaurant, for example, and provide the vector as an input for the particular user in the training data set.

The training data set may also include training inputs that indicate information about a particular merchant. For example, the training data set may include one or more types of a particular merchant, which may vary in specificity (e.g., a restaurant may be assigned a type of cuisine such as "Thai", a type of service such as "take-out," a type of location such as "downtown," a user price rating such as "$$," etc.). The type determinations may be generated based on information associated with the restaurant, such as user ratings, data maintained by third party data providers, information provided by the restaurant on a website, menu information, etc. As such, the search system 101 may obtain the third-party information (e.g., from third party data server (s) 105) in order to generate training inputs to fill out the training data set. The search system 101 may also generate other data from information about the merchant for the training data set. For example, the search system 101 may generate training inputs indicating one or more product costs for the merchant (e.g., from a menu of items and corresponding prices), and/or or an average price of items on a restaurant's menu. Similarly, the search system 101 may generate one or more inputs indicating an average price of an appetizer for a restaurant, an average price of a main course, an average price of a drink, the highest-priced item on the menu, the highest-priced drink on the menu, etc. Such data may be generated and/or obtained for each of the merchants in the training data set.

The merchant data may also include inputs that are generated based on user reviews and/or ratings. For example, an average user rating of the restaurant may be used as an input corresponding to a particular merchant in the training data set. As another example, an average user price rating may be used as an input corresponding to a particular merchant in the training data set. Additionally and/or alternatively, the text of user reviews may be processed to generate one or more merchant inputs for the training data set. For example, the search system 101 may process user reviews to determine that users commonly use certain words relating to the price of a merchant (e.g., "expensive," "affordable," etc.) and may generate data values based on the presence and/or frequency of these words in user reviews for the merchant. These data values may then be used as inputs for a training data set.

The training data set may also include labeled outputs that indicate, for a particular merchant-user combination, a customized price rating. The training data set thus may include training examples that may be used in a supervised learning process. For example, the training data set may indicate that a particular user gave a particular rating to a particular merchant. This labelled data may be used to train the machine learning model to predict outputs based on merchant and user data. Additionally and/or alternatively, the training data set may omit labeled outputs and/or may use an unsupervised learning process to train a machine learning model.

At step 302, the search system 101 may train the machine learning model using the machine learning software 127 and the training data set 129. As discussed above with respect to FIG. 2, training the machine learning model may be performed in any manner appropriate to the machine learning model in question. For example, machine learning software 127 may be executed on a wide plurality of nodes, such that training the customized price rating machine learning model may comprise providing, to an input node, the training data from the training data set 129.

As shown in FIG. 3, the trained model may be integrated into a search process. For example, the search system 101 may train the machine learning model using a development environment, then deploy the trained model to a production environment that provides a live search system. In some cases, the training process may occur on a different machine or group of machines (e.g., a development server) than the machine or group of machines that implement the search process. As one of ordinary skill will recognize, the term "search system 101" as used herein may encompass machines for both development and production, which may be implemented separately.

At step 303, as part of the search process, the search system 101 may receive a query from a client device. The received query may comprise at least one of search terms, a user identifier, a user location, and/or other metadata (e.g., an IP address). Additionally and/or alternatively, the query may include data in a media format, such as audio data, and the search system 101 may convert the data into a textual form (e.g., using a text-to-speech algorithm to convert an audio query into textual search terms). The client device from which the query is received may use any type of search user interface to generate the query. For example, a user of the device may input one or more search terms into a search field of a search application running on the client device, and the client device may then generate and send a query including the search terms, a GPS location of the client device, a user identifier, and/or other metadata. As another example, a messaging application on the client device may automatically recognize when a personal message includes relevant search terms, and may automatically generate and send a query including the search terms, a GPS location of the client device, a user identifier, and/or other metadata. The search system 101 thus may receive queries from various devices, and from various applications running on various devices, and may be configured to receive queries in one or more formats (e.g., by exposing a query API that a client application may use to transmit queries containing various data).

As shown in the figure, the search system 101 may execute steps 304-305 and steps 306-307 in parallel. Alternately, the search system 101 may execute steps 304-305 serially before or after steps 306-307, or in any other order. In some cases, the inputs obtained at steps 305 and 307 may be generated and stored in advance and merely retrieved at steps 305 and 307. For example, the search system 101 may store processed inputs associated with each merchant in database 131 of the search system 101, and may also store processed inputs associated with each user in database 131 of the search system 101. Additionally and/or alternatively, certain data may generated and/or updated at search time based on dynamic data (e.g., based on a menu that is updated daily from a merchant's website, based on merchant ratings information that may be updated at any time, or based on user transaction data that may be updated at any time).

At step 304, the search system 101 may match information from the query to a particular user identifier. In some cases, the query may already contain a user identifier, and therefore step 304 may simply involve extracting the user identifier from the query. In other cases, information from the query must be used to match a user identifier. For example, a device identifier, IP and/or MAC address, or other such information may be used to find a user identifier. The user identifier may be associated with data stored about the user in database 131 of the search system 101.

At step 305, the search system 101 may retrieve and/or process user data from a user profile that is associated with the user identifier to obtain user data inputs for the machine learning model. For example, the user data of the user profile may include transaction data for previous user transactions at various merchants, and that user data may provide an indication of a user spending habit. The transaction data may include, for each of a plurality of transactions, an amount spent, a name or identity of the merchant, one or more types of the merchant (e.g., a type of cuisine served by a restaurant, a type of location, a type of service, etc.). In some cases, the transaction data may also include details about what types of items were purchased (e.g., what dishes and/or drinks were purchased from a restaurant). The search system 101 may use the transaction and/or other user data to generate one or more inputs for the machine learning model trained in step 302. As one example, the search system 101 may process the transaction data to determine an average price spent by the user at restaurants, a standard deviation of the average price, a highest amount spent by the user at restaurants, a favorite (e.g., most common) dish ordered by a user at a restaurant, an indication of whether the user commonly orders wine at a restaurant, and/or other similar indications that may be derived from the transaction data described above. The search system 101 may generate weighted averages, with more recent transactions weighted more highly.

Other transaction data may also be processed to determine relevant information about a particular user. For example, the search system 101 may process transactions involving a specialty wine distributor to determine whether a user likes wine, an average amount that a user prefers to spend on a bottle of wine, and the like. As another example, the search system 101 may categorize all transactions for a particular user. As more specific examples, a first transaction may be categorized as a "clothing" transaction, a second transaction may be categorized as a particular type of restaurant (e.g., a fancy restaurant), and a third transaction may be categorized as a different type of restaurant (e.g., a takeout restaurant). Thus, the user transaction data may be categorized before being used as input(s) to (or to generate inputs for) the machine learning model.

The search system 101 may process user transaction data to determine one or more spending habits of a user over time, which may be used in the training data set. For example, a user might be more prone to spending more money at a restaurant on weekends as compared to during the week. Thus, the search system 101 may generate a vector indicating a user's average spending per day of week, for example, and provide the vector as an input to the machine learning model. As another example, a user might spend more on clothing in the summer than they do in the winter. Thus, the search system 101 may generate a vector indicating a user's average spending for different seasons and for different types of categories, and provide the vector as an input to the machine learning model. As another example, a user might be willing to spend more at certain types of restaurants than others, and thus the search system 101 may generate a vector indicating a user's average spending at different categories of restaurant, for example, and provide the vector as an input to the machine learning model.

The search system 101 may filter the transaction data obtained from the user profile to generate more specific indication(s) of a spending habit that may be used as input to the machine learning model. For example, if the user query received at step 303 indicated an interest in a certain type of restaurant, the transaction data may be filtered to transactions involving similar types of restaurants (e.g., transactions involving restaurants of the same or similar type, transactions involving restaurants of the same or similar location, transactions involving restaurants with the same level of service, etc.), therefore providing a better indication of the user's spending habits at relevant merchants. Additionally and/or alternatively, the transactions may be filtered by time period. For example, if the user query received at step 303 indicates a desire to find a restaurant for dinner (e.g., it may include time-based keywords such as "open this evening" or terms that generally indicate a certain meal, such as "cocktails"), the transactions may be filtered to those that take place in the evening in order to generate a better estimate of the user's spending habit during the relevant time period. The search system 101 may further process the filtered transaction data in the same way as discussed above to generate inputs for the machine learning model. For example, the search system 101 may generate, using the filtered transaction data, an average transaction amount for the user, a highest amount spent by the user, etc. As above, more recent data may be weighted more highly in a weighted average.

In some cases, the search system 101 may also generate input data indicating a particular user's previous ratings of other merchants. For example, if the user previously gave a particular restaurant a "$$$" rating, an indication of the restaurant and the user rating may be formatted as user data input for the machine learning model. As discussed below, the search system 101 may receive these ratings (e.g., at step 311) and store them in a user profile (e.g., in database 131) so they may later be used as machine learning inputs.

At step 306, the search system 101 may use data from the query to match and rank a set of one or more merchants. The search system 101 may use search software 125 for query matching and ranking. In an exemplary embodiment, the search system 101 provides a restaurant search, and the search system 101 may thus match one or more restaurants based on the various data in the query received at step 303. For example, the search system 101 may match one or more query terms (e.g. "thai") to a restaurant based on a name of the restaurant (e.g., "Thai Kitchen"), a type of cuisine associated with the restaurant, a dish that is served by the restaurant (e.g., "pad thai"), etc. The search system 101 may thus find a set of restaurants that match a search query based on one or more search terms included in or derived from the query. Additionally and/or alternatively, the search system 101 may find the set of merchants based on other data, such as location data. For example, the search system 101 may restrict the set of restaurants to restaurants that are nearby a location of the user (e.g., within a certain number of miles).

If the query does not include a location, the search system 101 may infer a location based on an IP address or other metadata. In some cases, search query terms may be used to determine a location. For example, the query may include relative location terms such as "near me" or "within 5 miles," and the search system 101 may use these relative terms to filter the set of matching merchants to those near a current location of the user (which may be determined or inferred from other query data, as previously explained). In some cases, the search query terms may include other location data (e.g., "NYC" or "downtown"), which the search system 101 may use to filter the set of merchants to those that are within a certain area (e.g., New York City, or the nearest downtown). In some cases, the search system 101 may infer a location for the user based on previous queries. For example, if a user previously entered a first query with a location (e.g. "steakhouse NYC") and then enters another query without a location (e.g. "cocktails"), the set of matching merchants for the second query may be limited to those within the location specified in the first query (e.g., a search for cocktails in NYC). Thus, the search system 101 may maintain information about particular users, which may also be used to filter a set of merchants at step 304. This technique may also be extended to other types of information beyond location information. Accordingly, various data, both from within a query and/or from a user profile or other information associated with the user, may be used to find one or more merchants at step 306.

The search system 101 may score and/or order each merchant of the set of merchants based on how closely the corresponding merchant matches the query (e.g., based on how many search terms they match, how close they are to the area specified by the user, etc.), and rank the set of merchants based on their corresponding scores.

At step 307, information about one or more of the set of merchants found at step 306 may be retrieved in order to obtain and/or generate inputs for the customized pricing rating model. For example, the search system 101 may label a merchant with one or more types, which may vary in specificity (e.g., a restaurant may be assigned a type of cuisine such as "Thai", a type of service such as "take-out," a type of location such as "downtown," a user price rating such as "$$," etc.). This labelling process may occur at search time and/or the search system 101 may retrieve a previous label determination for a merchant. The type labels may be based on information associated with the restaurant, such as user ratings, data maintained by third party data providers, information provided by the restaurant on a website, menu information, product costs, etc. The search system 101 may retrieve (e.g., from database 131) product costs for the merchant (e.g., a menu of items and corresponding prices) and process them into a format that was used to train the machine learning model. The search system 101 may also generate other data from information about the merchant. For example, the search system 101 may generate an input indicating an average price of items on the menu, and other similar indications of product costs. Similarly, the search system 101 may generate one or more inputs indicating an average price of an appetizer, an average price of a main course, an average price of a drink, the highest-priced item on the menu, the highest-priced drink on the menu, etc.

In some cases, the search system 101 may be able to predict a specific item (e.g., a good or service) that a user will purchase based on the query received at step 303, and provide more tailored merchant inputs accordingly. For example, if the user restaurant query includes the name of specific menu item (e.g., "pad thai") or class of item (e.g., "steak"), then the search system 101 may retrieve one or more specific product prices associated with the merchant and use them to generate inputs. For example, the price of a specific dish that the user is likely to order based on the user query may be used as an input, or a number derived from several relevant product prices (e.g., the average cost of a steak on a steakhouse menu, the maximum cost of a steak on a steakhouse menu, and/or the minimum cost of a steak on a steakhouse menu may be used as inputs). These more tailored inputs may be used by the search system 101 along with or instead of more general inputs (e.g., instead of an input indicating an average cost of every item on the menu) in situations where a specific type of product is indicated by the query.

In some cases, the search system 101 may further tailor the merchant data inputs based on the user spending habit data. For example, the search system 101 may be able to predict a favorite item that a user will likely order based on the user transaction history, even when the user does not explicitly specify the item in the query. For example, if transaction data indicates that a user usually or always orders a favorite dish at a certain type of restaurant, the search system 101 may predict that the user will order the favorite dish for any restaurant of that type. The search system 101 may then determine the cost of the predicted item, which may be used as a merchant input along with or instead of a more general input (e.g., instead of an input indicating an average cost of every item on the menu). Similarly, the transaction history may indicate that the user has certain preferences (e.g., the user is vegetarian), which may enable the search system 101 to generate more tailored product cost inputs (e.g., the search system 101 may generate an average cost of vegetarian items on the menu, which may be used instead of an average cost of every item on the menu).

At step 308, the search system 101 may use the inputs to generate a custom price rating for one or more merchants using the machine learning model. The search system 101 may supply the inputs as generated and/or retrieved at steps 305 and 307 to the machine learning model to generate an output for each of the one or more merchants. For example, the search system 101 may use the same user data for each rating generated, but may use the corresponding merchant data inputs to generate a customized rating for the corresponding merchants (e.g., it may use the inputs for a first merchant and the user inputs to generate first customized rating for the first merchant, the inputs for a second merchant and the user inputs to generate a second customized rating for the second merchant, etc.). In some cases, the search system 101 may initially generate customized ratings for only a subset of the set of merchants found in step 306 (e.g., the top ten merchants), and then may subsequently generate customized ratings for additional merchants (e.g., the second ten merchants) if the user requests information about them (e.g., by switching from a first page of search results to a second page of search results on a screen of the client device). The client that provided the query in step 303 may control this behavior by requesting a certain number of results (e.g., via initial and subsequent calls to an API used to supply the query). Thus, by generating additional customized ratings only when requested, the search system 101 may be able to more efficiently deal with large sets of merchants without slowing down.

The machine learning model may generally map the one or more inputs to a given output indicating a customized price rating, and thus may be able to predict a customized price rating for every user-merchant pairing based on the inputs corresponding to the user and the inputs corresponding to the merchant. For example, the trained machine learning model may tend to increase a customized price rating (e.g., relative to another user's customized price rating) when a user tends to spend less money on restaurants (e.g., reflecting the user's aversion to spending lots of money at restaurants, as indicated by the user's transaction history), but may make an exception when the user tends to spend money on one particular kind of restaurant, or on a certain night of the week, or based on any other idiosyncratic preference of the user, as reflected by the user's transaction histories. By training a machine learning model that accounts for a myriad of factors, various and even unpredictable patterns may be detected and a customized price rating may be adjusted accordingly.

The model used by the search system 101 may output a customized rating in a numerical or categorical format. For example, the machine learning model may output a customized price rating on a scale from 0-100. Additionally and/or alternatively, the machine learning model may output a category corresponding to various price rating levels (e.g., a first category for "$", a second category for "$$", a third category for "$$$", etc.) for various indications of whether a user might find a restaurant to be relatively cheap or expensive based on the user's tastes, preferences, and habits. Because the machine learning model takes in merchant data (e.g., product costs) and user data (e.g., spending habits data) as input, it may, in general, indicate a comparison between the average cost of a merchant relative to an average past expenditure by a user at various other merchants.

In some cases, the search system 101 may only generate one, or a small number, of search results for a user based on a query. For example, some types of applications may only request, via a query API, a single result, three results, etc. However, in these or other situations, the search system 101 may be configured to detect whether additional search results should be provided. For example, if all of the customized price ratings generated for the small set of merchants are above a threshold (e.g., if all of the customized price ratings are over 80/100, or are in the top category "$$$$"), then the search system 101 may automatically generate additional customized price ratings for additional merchants until it finds one that is below a threshold (e.g., until it finds a merchant with a price rating below 60/100) and add the qualifying merchant to the set of merchants. Thus, the client device may be able to suggest additional merchants to the user if the user is less likely to be satisfied with the initial set of merchants based on the customized price ratings.

At step 309, the search system 101 may generate search results based on the customized ratings generated at step 308. The search system 101 may generate display information for each of the merchants for which customized ratings were generated at step 308. For example, if the machine learning model outputs a score of 15 out of 100 for a first merchant, the search system 101 may generate a search result including a display icon indicating a single dollar sign ($) to indicate that the restaurant is relatively inexpensive for that user. By contrast, if the machine learning model outputs a score of 90 out of 100 for a second merchant, the search system 101 may generate a search result including a display icon indicating four dollar signs ($$$$) to indicate that the restaurant is expensive for that user. The search system 101 may also use other currencies and display formats.

In some cases, the search system 101 may further tailor the displayed search results for the user. For example, if the user transaction data analyzed at step 305 indicates that the user has a favorite dish, is vegetarian, or has other such preferences, the search system 101 may generate a search result include information indicating that the restaurant's menu has the user's favorite dish (along with, e.g., price information), has vegetarian options, etc. Similarly, if the search system 101 determined that the user likes wine (e.g., at steps 305 or 307), the displayed search results may include a user review discussing the restaurant's wine selections and the like. The search system 101 may also include, in the customized search result for a merchant, information that was calculated at steps 305 or 307, such as the average cost of a dish, the average cost of a drink, and the like. By displaying this additional information along with the customized price rating for the user, the user may be able to more easily select which merchant they prefer. The search system 101 may perform this step for several of the merchants (e.g., the top ten ranked restaurants) to initially generate one or more search results, and may additionally repeat the process if the user requests information about other merchants (e.g., by scrolling to view additional search results on a search results page of a restaurant search application running on the user device).

In some cases (e.g., when the received query was a voice command), the search system 101 may format a search result to include textual information that may be used by a text to speech algorithm at the user device and/or may generate audio data at the search system 101 using a text to speech algorithm. In these cases, the search system 101 may convert the customized price rating to one or more words such as "one dollar sign," "two dollar signs," etc., or other descriptions such as "inexpensive," "relatively inexpensive," or the like, which may be more suitable for an audio interface. Additionally and/or alternatively, the search system 101 may generate additional information about the merchant that is appropriate for conversion to audio data (e.g., "The average price for a meal here is forty dollars" or the like), which the search system 101 may provide to the client and/or use to generate audio to be sent to the client.

At step 310, the search system 101 may send the search results information to the client. The search results information may include some or all of the information generated at step 309, as well as additional information such as the name and address of the merchant, an image representing the merchant, a link to a website of the merchant, and the like. The sent information may be formatted in such a way that the client may render it for display or other output (e.g., as JSON and/or markup language data), and may include links, rendering information, and other such information. In some cases, the search system 101 may send information that may allow a user to interact with the search system 101, for example by requesting additional search results (e.g., using various link), which the search system 101 may receive and respond to as mentioned above (although these steps are not shown in the flowchart of FIG. 3).

At step 311, the search system 101 may receiving a merchant rating from a user of the client device. For example, the search system 101 may have generated a search result including a customized price rating of "$$" for a merchant, but the user may disagree with this rating and instead rate the merchant as "$$$." The search system 101 may store the user rating and, in the future, use the user's personal rating when displaying information about the same merchant. Additionally, the user rating may be stored in the data associated with the user in database 131. As discussed above, this data may be used at step 305 to generate user data inputs for the machine learning model. Additionally, the user's own customized price rating may be added, along with other user and merchant data, to the training data set discussed for step 301 so that the machine learning model may later be retrained with better training data. Thus, by continually adding user data to the training data set and incorporating user ratings into the inputs used by the machine learning model, the search system 101 may, over time, gain an increased ability to accurately predict a customized user price rating for a particular user and for users in general.

FIG. 5 illustrates an example user interface 500 that may be used to send a query to search system 101 and received search results that include customized price ratings according to the process of FIG. 3. As shown in the figure, the user interface 500 may be displayed on the user device 107, and/or may be displayed on any other user device. The user interface 500 may include a function (e.g., input box 501) for submitting a query. Additionally and/or alternatively, a user may submit a voice query (e.g., by talking to a voice assistant), or may provide a query via any other type of application and/or input method. The user interface 500 may also display one or more search results received from the search system 101 (e.g., search results 502 and 503). Although two example search results are shown, more or fewer search results may be displayed based on how many search results are returned by the search system 101 and/or how many search results a particular application is configured to display at a time.

Each search result may include a customized price rating generated according to the process of FIG. 3. For example, the search result 502 includes a customized price rating of "$$$" based on a corresponding score of 67, which may have been generated by the machine learning model based on inputs corresponding to a first merchant called "Old Fashioned Steak" and inputs corresponding to the user who submitted the query. In the illustrated example, the merchant in the first search result 502 may be considered relatively expensive based on the prices of the merchant, the spending habits of the user, and the other inputs to the machine learning model. The first search result 502 may also list and show a price for a predicted dish for the user (e.g., the ribeye steak) based on transaction data indicating that the user commonly orders this dish, and menu data indicating the price of the dish, as discussed above. It may also include a relevant excerpt of a review based on transaction data indicating a preference of the user (e.g., that the user likes wine), as discussed above.

A second example search result 503 may include a second customized rating of "$$" indicating that the user will find a second merchant to be relatively less expensive than the first merchant based on a corresponding score of 46, which may have been generated by the machine learning model based on inputs corresponding to the second merchant and inputs corresponding to the same user. In the second example search result, the second merchant may be considered relatively less expensive for many reasons based on the inputs to the machine learning model. For example, even if the second merchant is generally more expensive than the first merchant (e.g., based on the average price of a dish), the user's favorite dish may be less expensive at the second merchant, leading to a reduced customized price rating for the second merchant because the price of the favorite dish may be supplied as input to the machine learning model, as discussed above.

Figure 4:
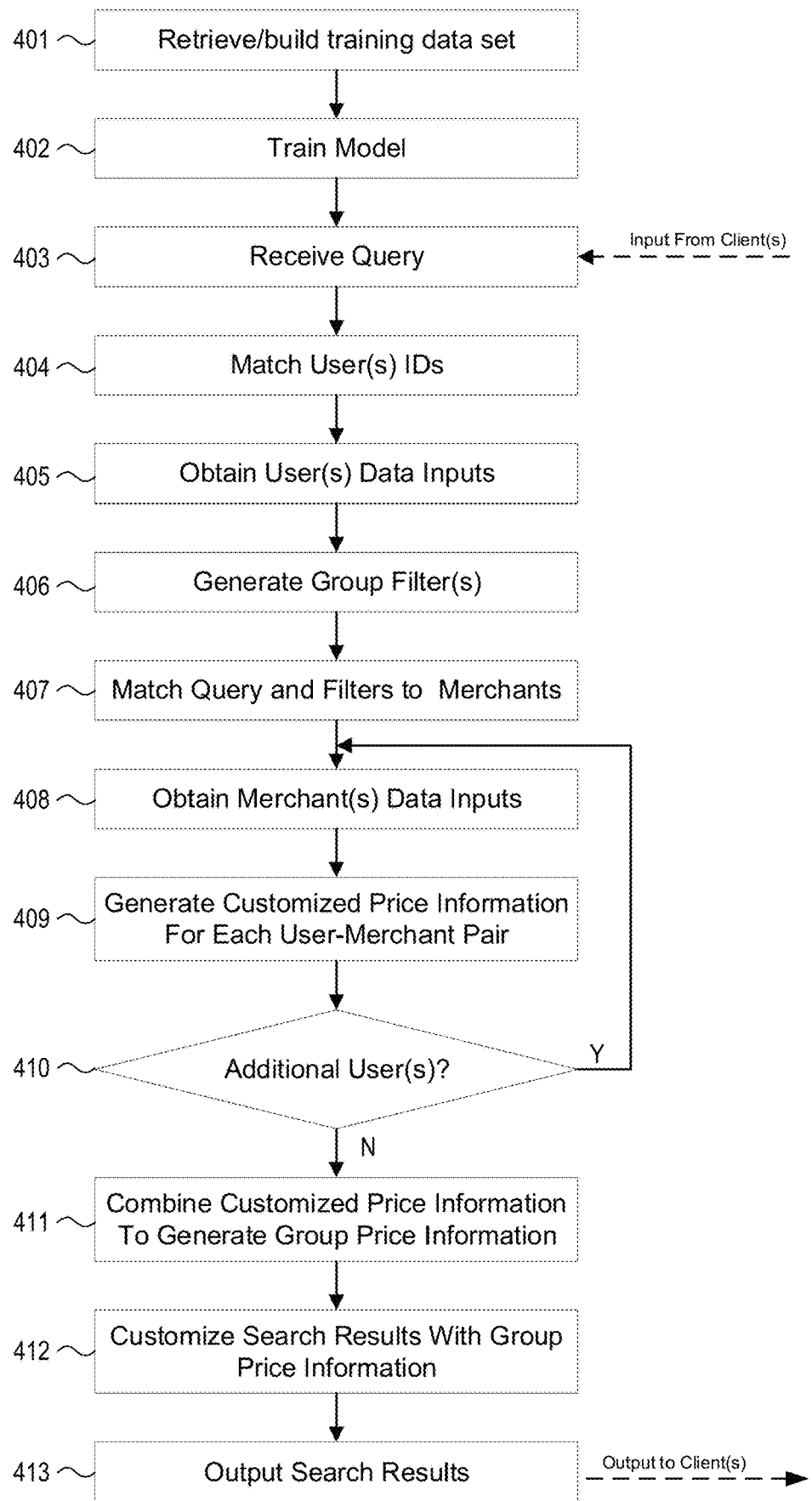
FIG. 4 shows a flow chart of a process for generating and displaying customized price ratings for a group of users according to one or more aspects of the disclosure.

As one of ordinary skill will understand, the illustrated user interface 500 is exemplary, and many other types of user interfaces may be used to send queries to search system 101 and/or display search results from FIG. 4 illustrates steps of a training and search process for generating customized price ratings for a group of users, which may be executed by the search system 101. The search system 101 may use the same training process described for FIG. 3 (e.g., at steps 301-302) to train and/or re-train a machine learning model that is used in the search process of FIG. 4. The search system 101 may also re-train a machine learning model using the training process based on data obtained via execution of the search process of FIG. 4 in the same manner as described for FIG. 3, and therefore the training process may be re-executed at any time. Accordingly, steps 401 and 402 may be executed by the search system 101 in the same way as for steps 301 and 302. In other words, the machine learning model trained according to steps 301 and 302 may also be used for the method of FIG. 4.

At step 403, the search system 101 may receive a group query from one or more client devices operated by users of a group. The received query may comprise at least one of search terms, a plurality of user identifiers, a group identifier, a user and/or group location, and/or other metadata (e.g., an IP address of a user device that sent the query). Additionally and/or alternatively, the query may include data in a media format, such as audio data, and the search system 101 may convert the data into a textual form (e.g., using a text-to-speech algorithm to convert an audio query into textual search terms). The client device(s) from which the query is received may use any type of search user interface to generate the group query. For example, one or more users of the group may input one or more search terms into a search field of a group search application running on the respective client device(s) of the group's users, and the client device(s) may then generate and send one or more quer(ies) including the search terms, a GPS location of the client device(s), user identifier(s), and/or other metadata. For example, each user of the group may input one or more terms describing a type of restaurant they would like (e.g., a type of cuisine, a location, a certain dish), any dietary restrictions they have (e.g., vegetarian), and the like. As another example, a group messaging application on the client device may automatically recognize when group messages includes relevant search terms (e.g., the group users may discuss types of cuisines, locations, etc. in a group chat), and may automatically generate and send one or more quer(ies) including the search terms, a GPS location of the client device(s) for the users in the group, one or more user identifier(s) for the group, and/or other metadata. The search system 101 thus may receive queries from multiple devices of a group. It may be configured to receive queries in one or more formats (e.g., by exposing a query API that a client application may use to transmit queries containing various data).

The search system 101 may also prompt a user for more information about the users of a group when a user submits a group query. For example, the user may submit a group query specifying a group of three users, but the query may not include user identifiers for one or more of the users of the group. The search system 101 may then send a reply to the user's query that causes the user's device to prompt the user for information about one or more of the users of the group.

At step 404, the search system 101 may match information from the query to a plurality of user identifier(s). In a simple case, the query may already contain a user identifier for some or all users of the group, and therefore step 404 may simply involve extracting the user identifiers from the query. In some cases, other information from the query must be used to match a user identifier. For example, device identifier(s), IP and/or MAC address(es), or other such information may be used to find user identifier(s) for each user of the group. In some cases, the query may include a group identifier, which the search system 101 may use to obtain a user identifier for each user of the group. The user identifier and/or group identifiers may be associated with data stored about each user in database 131 of the search system 101. Additionally and/or alternatively, a user profile stored in database 131 for a user may list information about the user's friends or contacts, such as user names, phone numbers, email addresses and/or the like. Thus, if a user supplies one piece of information about a member of the group (e.g., another user's name), the search system 101 may be able to determine the user identity based on other information in a user's profile.

At step 405, the search system 101 may retrieve and/or process user data from a user profile for each user of the identified users to obtain a set of user data inputs for the machine learning model for each user. In general, the step of processing user data to generate machine learning inputs may proceed in the same manner as described above for step 305. In other words, the search system 101 may retrieve spending habit data including transactions for each user, and may generate user inputs for the machine learning model based on the spending habit. The search system 101 may generate a separate set of inputs for each of the users in order to generate individual customized price ratings for each user. Additionally and/or alternatively, the search system 101 may generate one set of group inputs based on group-level spending habits (e.g., based on a combined set of transactions for all of the members of the group). Similar to the process described above for step 305, the search system 101 may generate user- or group-level averages and other inputs, which may be weighted averages that weight more recent data more heavily. The search system 101 may also process other transaction data may also be processed to determine relevant information about a user and/or the group. For example, the search system 101 may process transactions involving a specialty wine distributor to determine whether one or more user(s) of the group likes wine, an average amount that users of the group prefer to spend on a bottle of wine, and the like.

Similar to the process described in step 305, the search system 101 may also filter the transaction data obtained from the various user profiles to generate more specific indications of each user's spending habits for generating model inputs. For example, if the user quer(ies) received at step 403 indicated an interest in a certain type of restaurant, the transaction data for that user may be filtered to transactions involving similar types of restaurants (e.g., transactions involving restaurants of the same or similar type, transactions involving restaurants of the same or similar location, transactions involving restaurants with the same level of service, etc.), therefore providing a better indication of the user's spending habits at relevant merchants. Additionally and/or alternatively, the transactions may be filtered by time period. For example, if the quer(ies) received at step 403 indicate a desire to find a restaurant for dinner (e.g., they may include time-based keywords such as "open this evening" or terms that generally indicate a certain meal, such as "cocktails"), the transactions may be filtered to those that take place in the evening in order to generate a better estimate of the user's spending habit(s) during the relevant time period. The search system 101 may further process the filtered transaction data in the same way as discussed above to generate inputs for the machine learning model. For example, the search system 101 may generate, using the filtered transaction data, an average transaction amount for each user, a highest amount spent by each user, etc. As above, more recent data may be weighted more highly in a weighted average.

The search system 101 may also (in the same manner as for step 305) generate input data indicating each user's previous ratings of other merchants. For example, if one user previously gave a particular restaurant a "$$$" rating, an indication of the restaurant and the user rating may be formatted as an input for that user's set of inputs for the machine learning model.

Thus, the search system 101 may generate a set of machine learning inputs for each user, based on the corresponding data it obtains for that particular user, which may be filtered before being processed. These inputs may be used to generate a customized price rating for each individual user, as explained in detail below. Additionally and/or alternatively, a set of group-level inputs may be generated by the search system 101 that enable the search system 101 to generate a group-level customized price rating. These group-level inputs may be based on a combination of data for all of the users (e.g., combining transactions for each of the users into a single pool of transactions), which may also be filtered before being processed to generate the inputs.

At step 406, the search system 101 may generate a set of group filters in order to better target the various preferences and requests of the users of the group. This process may be particularly advantageous when a query is submitted by only a single user of the group, but may also be used in other cases. By generating group filters, preferences of other users may be used to find merchants that meet every user's preferences, even if the other user's preferences are not indicated in the query.

The search system 101 may generate group filters based on data stored in a user profile for each user. For example, a user profile for one of the users of the group, stored in database 131, may indicate that the user is vegetarian. This user preference may have been supplied by the user and/or derived implicitly from the user's transaction history (e.g., from locations the user often visits, or based on dishes the user usually orders, as indicated by the transaction history). As another example, another user's preferences may indicate a like for certain types of cuisines and/or a dislike for other types of cuisines, a like or dislike of a location or type of service, etc. As a third example, a user's preferences may indicate a favorite dish or type of dish for a particular type of restaurant. Again, these preferences may have been provided explicitly to the search system 101 or derived implicitly by the search system 101 (e.g., based on the transaction history). The search system 101 may generate group filters that indicate certain requirements (e.g., a filter may require that vegetarian options are available at a restaurant), indicate certain likes or dislikes (e.g., a filter may indicate that certain cuisines are liked by X number of users or disliked by Y number of users), and/or indicate certain favorite items.

The search system 101 may also generate group filters that indicate a number of users in the group and may filter merchants based on whether the merchants can accommodate the number of users in the group. The search system 101 may access an API provided by a website and/or third-party service to determine the availability of a merchant for a group of a particular size. For example, if a group of five users is searching for a restaurant, the group filters may filter out restaurants that do not have availability for a group of five. Thus, the search system 101 may generate a data structure including one or more rules that may be used to search for, rank, and filter merchants.

At step 407, the search system 101 may use data from the query and/or group filters to match and rank a set of one or more merchants. As described above for step 306, the search system 101 may use search software 125 to provide a restaurant search, and the search system 101 may thus match and rank one or more restaurants based on the various data in the query received at step 403 and the filters generated at step 406. The query matching and scoring may work much the same as described above for step 306. If multiple users provide query terms, the multiple query terms may be combined into a single query that is used to search for matching merchants. In addition to the query matching, the group filters may be used to exclude and/or affect the ranking of merchants found by the query matching. For example, if the group filter requires that vegetarian options are available, then restaurants without vegetarian options may be excluded from the set of matching results. Any preferences or dislikes indicated by the group filters may be used to affect the ranking of a merchant. For example, if the group filter indicates that three out of five members of the group like a certain type of restaurant, then a restaurant of the same type may receive a proportional boost to its ranking score (e.g., a score boost that is proportional to the 60% of users that like the cuisine). Conversely, for example, if the group filter includes data indicating that two of out five users dislike a certain type of restaurant, then a restaurant of the same type may receive a proportionally reduced rating. The search system 101 may weight explicit dislikes in the group filter more heavily than likes (e.g., such that one user disliking a type of restaurant may reduce the ranking score by more than one user liking the same type of restaurant increases it). Any favorite items indicated by the group filters may also be used to boost a score ranking. For example, if a first merchant has a first user's favorite item, the first merchant may receive a boost to its ranking score. If the first merchant also has a second user's favorite item, it may receive an additional boost to its ranking score.

In one exemplary strategy, the search system 101 may generate a base ranking score for each merchant of the set of merchants based on how closely the corresponding merchant matches the query (e.g., based on how many search terms they match, how close they are to the area specified by the user, etc.). The search system 101 may then apply the adjustments and filtering from the group filters to adjust the ranking of certain merchants as indicated by the group filters, and then rank the set of merchants based on their corresponding adjusted scores.

At step 408, information about one or more of the set of merchants found at step 407 may be generated or retrieved in order to obtain inputs for the customized pricing rating model. This process may work in the same way as described above for step 307. In other words, the search system 101 may generate and/or retrieve merchant data inputs, including product cost data and other data, for at least a subset of the merchants that were matched in step 407 (e.g., the top ten ranked merchants).

As described above for step 307, the search system 101 may be able to predict specific item(s) that one or more users of the group will order based on the quer(ies) received at step 403, and/or based on other data implicitly determined from each user's transactions (e.g., a particular user's favorite dish for a certain type of restaurant). The search system 101 may then generate a different set of tailored merchant data inputs for each user. For example, if a first user of a group is predicted to order one item, then merchant cost data for that item may be included in a set of merchant data that is specific to the first user. Similarly, if a second user of a group is predicted to order a certain type of item, then the search system 101 may calculate an average cost data for that type of item for the particular merchant, and may include the average cost in a set of merchant data is specific to the second user. Thus, as described for step 307, merchant data may be tailored for each user based on the spending habit data of each user, based on a predicted order of each user, and the like.

Although not shown in FIG. 4, the search system 101 may execute steps 404-406 and steps 407-408 in parallel. Alternately, the search system 101 may execute steps 404-406 serially before or after steps 407-408, or in any other order. In some cases, the inputs obtained at steps 405 and 408 may be generated and stored in advance and merely retrieved at steps 405 and 408. For example, the search system 101 may store processed inputs associated with each merchant in database 131 of the search system 101, and may also store processed inputs associated with each user in database 131 of the search system 101. Additionally and/or alternatively, certain data may generated and/or updated at search time based on dynamic data (e.g., based on a menu that is updated daily from a merchant's website, based on merchant ratings information that may be updated at any time, or based on user transaction data that may be updated at any time).

At step 409, the search system 101 may use the merchant and user inputs to generate a customized price rating, for each user-merchant pair, using the machine learning model. The search system 101 may thus supply the inputs as generated and/or retrieved at steps 405 and 408 to the machine learning model to generate, for a first user, an output for each of the one or more merchants. For example, the search system 101 may use the same first user data inputs for each first user customized price rating, but may use the corresponding merchant data inputs to generate first user customized ratings for the corresponding merchants (e.g., it may use the inputs for a first merchant and the first user inputs to generate a first user customized rating for the first merchant, the inputs for a second merchant and the first user inputs to generate a first user customized rating for the second merchant, etc.). In some cases, the search system 101 may initially generate customized ratings for only a subset of the set of merchants found in step 407 (e.g., the top ten merchants), and then may subsequently generate customized ratings for additional merchants (e.g., the second ten merchants) if any user(s) of the group request information about them (e.g., by switching from a first page of search results to a second page of search results on a screen of the corresponding user's client device). The client(s) that provided the quer(ies) in step 403 may control this behavior by requesting a certain number of results (e.g., via initial and subsequent calls to an API used to supply the query). Thus, by generating additional customized ratings only when requested, the search system 101 may be able to more efficiently deal with large sets of merchants without slowing down.

The machine learning model used by the search system 101 may output, for each user-merchant pair, a customized rating in a numerical or categorical format. For example, the machine learning model may output a customized price rating on a scale from 0-100. Additionally and/or alternatively, the machine learning model may output a category corresponding to various price rating levels (e.g., a first category for "$", a second category for "$$", a third category for "$$$", etc.) for various indications of whether a user might find a restaurant to be relatively cheap or expensive based on the user's tastes, preferences, and habits. Because the machine learning model takes in merchant data (e.g., product costs) and user data (e.g., spending habits data) as input, it may, in general, indicate a comparison between the average cost of a merchant relative to an average past expenditure by a user at various other merchants.

The machine learning model may generally map the one or more inputs to a given output indicating a customized price rating for a given merchant-user pair, and thus may be able to predict a customized price rating for every user-merchant pairing based on the inputs corresponding to the user and the inputs corresponding to the merchant. For example, the trained machine learning model may tend to increase a customized price rating (e.g., relative to another user's customized price rating) when a user tends to spend less money on restaurants (e.g., reflecting the user's aversion to spending lots of money at restaurants, as indicated by the user's transaction history), but may make an exception when the user tends to spend money on one particular kind of restaurant, or on a certain night of the week, or based on any other idiosyncratic preference of the user, as reflected by the user's transaction histories. By training a machine learning model that accounts for a myriad of factors, various and even unpredictable patterns may be detected and a customized price rating may be adjusted accordingly.

At step 410, the search system 101 may increment to the next user, if any. Thus, if a customized price rating has been generated for each user for each merchant of the set of merchants, then the search system 101 may move onto the next step. If a customized price rating has not yet been generated for each user, then the search system may repeat steps 408 and 409 for the one or more users for which customized price ratings have not yet been generated. In other words, after generating a plurality of customized price ratings for a plurality of merchants for the first user, the search system 101 may proceed to generate a plurality of customized price ratings for the plurality of merchants for the second user. The search system 101 may thus iteratively generate customized price ratings for each user of the plurality of users. Although the search system 101 may thus generate multiple customized price ratings for the same merchant, it may vary the merchant data inputs. For example, as discussed above, if the search system 101 predicts that a first user will order a first dish at a first merchant, it may use first cost data for the first dish as a merchant data input for the first merchant. Conversely, if the search system 101 predicts that a second user will order a second dish at the first merchant, it may use second cost data for the second dish as a merchant data input for the first merchant. Accordingly, the set of merchant data inputs may vary from user to user, even for the same merchant.

In some cases (not shown), the search system 101 may additionally and/or alternatively generate group customized price ratings for each of the merchants based on the group-level user data inputs (as described at step 405 above) and the merchant data inputs for each merchant. Thus, the search system 101 may generate both individual and group-level customized price rating using the machine learning model.

As shown in FIG. 4, the decision at step 410 creates a loop that repeats until customized price ratings have been generated for each user of the group.

At step 411, the search system 101 may combine the various customized price ratings for each user to generate a customized price rating for the group (e.g., if a group rating was not generated directly from group-level inputs). For example, for a first merchant, if a first user has a customized price rating of 80/100, a second user has a customized price rating of 70/100, and a third user has a customized price rating of 95/100, the search system 101 may average the three customized price ratings to obtain a group price rating for the first merchant. In some cases, the search system 101 may generate a weighted average that assigns higher weights to users with higher price ratings. For example, the weighted average for the first merchant may assign a higher weight to the third user with a customized price rating of 95/100, thus biasing the average higher based on the third user's weighting. This combining process may repeat for the plurality of merchants for which individual customized price ratings were generated, in order to generate a group-level customized price rating for the plurality of merchants.

In some cases, the search system 101 may only generate one, or a small number, of search results for a group based on the group quer(ies). For example, some types of applications may only request, via a query API, a single result, three results, etc. However, in these or other situations, the search system 101 may be configured to detect whether additional search results should be provided automatically in certain cases. For example, if all of the customized group price ratings generated for the small set of merchants are above a threshold (e.g., if all of the customized group price ratings are over 80/100, or are in the top category "$$$$"), then the search system 101 may automatically generate additional group customized price ratings for additional merchants until it finds one that is below a threshold (e.g., until it finds a merchant with a price rating below 60/100) and add the qualifying merchant to the set of merchants. The search system 101 may provide this data to the client device(s) of the group, so that the group may be able to review additional merchants that may have a lower average price and thus may be more likely to satisfy a group preference.

At step 412, the search system 101 may generate search results based on the customized group-level ratings. The search system 101 may generate display information for each of the merchants for which customized group-level ratings were generated. For example, if the search system 101 generates a group score of 15 out of 100 for a first merchant, the search system 101 may generate a search result including a display icon indicating a single dollar sign ($) to indicate that the restaurant is relatively inexpensive for that group. By contrast, if the search system 101 generates a group score of 90 out of 100 for a second merchant, the search system 101 may generate a search result including a display icon indicating four dollar signs ($$$$) to indicate that the restaurant is expensive for that group. The search system 101 may also use other currencies and display formats.

In some cases, the search system 101 may further tailor the displayed search results for the group of users. For example, if any of the user transaction data analyzed at step 405 indicates that the user has a favorite dish, is vegetarian, or has other such preferences, the search system 101 may generate a search result include information indicating that the restaurant's menu has the particular user's favorite dish (along with, e.g., price information for the favorite dish), has vegetarian options, etc. Similarly, if the search system 101 determined that one or more of the users likes wine, cocktails, etc. (e.g., at step 405), the displayed search results may include a user review discussing the restaurant's wine selections, an average price of cocktails at the restaurant, and the like. The search system 101 may thus include, in the customized search result for a merchant, information that was calculated at step 408, such as the average cost of a dish, the average cost of a drink, and the like. Additionally and/or alternatively, the search system 101 may display availability times based on the size of the group if the merchant exposes this information online (e.g., via an API). By displaying this additional information along with the customized price rating for the group, the group may be able to more easily select which merchant they prefer. The search system 101 may perform this step for several of the merchants (e.g., the top ten ranked restaurants) to initially generate one or more search results, and may additionally repeat the process if the user requests information about other merchants (e.g., by scrolling to view additional search results on a search results page of a restaurant search application running on the user device).

In some cases, the search system 101 may also tailor the displayed search result to include the individual user customized price rating(s). For example, if customized price rating(s) for one user are above a certain threshold (e.g., more than 80/100), then that user's customized price rating may also be displayed along with the group price rating for the search result. Additionally and/or alternatively, in some cases all of the individual price ratings may be displayed along with the group price ratings.

In some cases (e.g., when the received query was a voice command), the search system 101 may format a search result to include textual information that may be used by a text to speech algorithm at the client device(s) of the group members and/or may generate audio data at the search system 101 using a text to speech algorithm. In these cases, the search system 101 may convert the customized price rating to one or more words such as "one dollar sign," "two dollar signs," etc., or other descriptions such as "inexpensive," "relatively inexpensive," or the like, which may be more suitable for an audio interface. Additionally and/or alternatively, the search system 101 may generate additional information about the merchant that is appropriate for conversion to audio data (e.g., "The average price for a meal here is forty dollars" or the like), which the search system 101 may provide to the client and/or use to generate audio to be sent to the client.

At step 413, the search system 101 may send the search results information to one or more of the client devices for the users of the group. The search results information may include some or all of the information generated at step 412, as well as additional information such as the name and address of each merchant, an image representing each merchant, a link to a web site of each merchant, and the like. The sent information may be formatted in such a way that each client may render it for display or other output (e.g., as JSON and/or markup language data), and may include links, rendering information, and other such information. In some cases, the search system 101 may send information that may allow each user to interact with the search system 101, for example by requesting additional search results (e.g., using various link), which the search system 101 may receive and respond to as mentioned above (although these steps are not shown in the flowchart of FIG. 4).

The feedback and re-training process may work much in the same way as described for FIG. 3. Thus, as described at step 311, user feedback data may be received and may be added to a training data set, which may be used to re-train the machine learning model at a later time, thus improving the operation and prediction abilities of the system over time.

FIG. 6 illustrates an example user interface 600 for providing a group search query. As shown in the figure, the user interface may be displayed on a user device 107, although other user devices may also be used. The user interface may allow a user to input a query (e.g., via input box 601), and may also include controls (e.g., input boxes 602, 603, 604) for adding information about users of a group, and one or more search results (e.g., search results 605, 606). In the displayed example, a user has indicated the user's own identity and the names of two other users. Other information such as phone number, email address, and/or other user identifiers may also be entered. Additionally and/or alternatively, such information may be stored in a user profile associated with the user by search system 101. For example, in the illustrated example, the user may supply the name "Jay," and the search system 101 may match the name to a particular user identifier associated with the name "Jay" in the user's profile in order to identify the corresponding user, as discussed above.

Additionally and/or alternatively, other types of user interfaces may be provided for performing a group search. For example, a query may be generated by a messaging application when a user types in a relevant message. As a specific example, if three users are in a group chat and one user sends a text that appears to be a restaurant query (e.g., "dinner tonight?"), then the messaging application may submit a query including the text and identifiers of the three users in the group chat. The messaging application may then prompt a user to display search results (e.g., search results 605, 606) and/or may automatically display the search results in the group chat.

Each search result may include a customized group price rating generated according to the process of FIG. 4. For example, the search result 605 includes a customized price rating of "$$$" based on a corresponding score of 64, which may have been generated by combining customized user price ratings for each user, as discussed above. The customized user price ratings for each user, in turn, may have been generated by the machine learning model based on inputs corresponding to the merchant "St. Benedict" and inputs corresponding to the respective user. In the illustrated example, the merchant in the first search result 605 may be considered relatively expensive based on the prices of the merchant, the spending habits of the respective users, and the other inputs to the machine learning model. A search result (e.g., search result 605) may also list and show a price for a predicted dish for one or more user (e.g., in the illustrated example, one user has a favorite dish of ribeye steak) based on transaction data indicating that a user commonly orders the favorite dish, and menu data indicating the price of the dish, as discussed above. Additionally and/or alternatively, it may indicate when a merchant meets another user's dietary preferences (e.g., in the illustrated example, one user may be a vegetarian). Additionally and/or alternatively, the search result 605 may include cost information for a type of good or service sold by the merchant (e.g., an average price of a cocktail) if one user commonly orders the corresponding good or service. It may also include a relevant excerpt of a review based on transaction data indicating a preference of the user (not shown), as discussed above.

A second example search result 606 may include a second customized rating of "$$$$" indicating that the group will find a second merchant to be very expensive based on the group's spending habit, the merchant's prices and other inputs as discussed above. The second example search result also illustrates availability for the size of the group, which may be displayed for merchants that list their availability online, as discussed above.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A method comprising:
   training, using training data comprising historical user transaction data that indicates amounts spent by each of a plurality of users when purchasing items of one or more item types, a machine learning model, implemented via a plurality of connected nodes that are part of a plurality of layers of an artificial neural network, to output, based on input data provided to an input layer of the artificial neural network and via an output layer of the artificial neural network, customized price indicators based on a spending activity for one or more users by adjusting, based on at least a portion of the training data, one or more machine learning model parameters associated with at least one connected node of the plurality of connected nodes;
   receiving, from a client device, a query comprising:
      one or more search terms; and
      a group identifier;
   identifying a plurality of users by:
      determining, based on device information corresponding to the client device, a first user identifier; and
      determining, based on the group identifier, one or more second user identifiers;
   retrieving, based on the plurality of identifiers, spending habit data for each of the plurality of users;
   predicting, based on the spending habit data for each of the plurality of users, one or more preferences, of the plurality of users, associated with purchasing good or services;
   generating, based on the one or more search terms, a list of merchants;
   modifying, based on the one or more preferences of the plurality of users, the list of merchants;
   for at least one merchant of the list of merchants, providing, as input to the trained machine learning model, the spending habit data for each of the plurality of users;
   generating a customized group price indicator for the at least one merchant based on outputs of the machine learning model; and
   causing display of the customized group price indicator for the at least one merchant.

2. The method of claim 1, further comprising:
   generating, for the at least one merchant, an average cost of items that match the one or more preferences, wherein the average cost of items that match the one or more preferences is provided as input to the machine learning model.

3. The method of claim 1, wherein the at least one merchant is a restaurant, wherein the one or more preferences comprise a dietary preference, and wherein the method further comprises:
   determining that the at least one merchant is compatible with the dietary preference, wherein the modifying of the list of merchants is based on the determining.

4. The method of claim 1, wherein the at least one merchant is a restaurant, wherein the one or more preferences comprise a favorite item, and wherein the method further comprises:
   determining that a menu of the at least one merchant includes the favorite item, wherein the modifying of the list of merchants is based on the determining.

5. The method of claim 1, wherein the modifying the list of merchants comprises filtering the list of merchants by removing merchants that do not match the one or more preferences of the plurality of users.

6. The method of claim 1, wherein the modifying the list of merchants comprises ranking the list of merchants based on the one or more preferences of the plurality of users.

7. The method of claim 1, further comprising:
   generating an indication that the at least one merchant is compatible with the one or more preferences of the plurality of users; and
   causing display of the generated indication.

8. A computing device comprising:
   one or more processors; and
   memory storing instructions that, when executed by the one or more processors, cause the computing device to:
      train, using training data comprising historical user transaction data that indicates amounts spent by each of a plurality of users when purchasing items of one or more item types, a machine learning model, implemented via a plurality of connected nodes that are part of a plurality of layers of an artificial neural network, to output, based on input data provided to an input layer of the artificial neural network and via an output layer of the artificial neural network, customized price indicators based on a spending activity for one or more users by adjusting, based on at least a portion of the training data, one or more machine learning model parameters associated with at least one connected node of the plurality of connected nodes;

receive, from a client device, a query comprising:
one or more search terms; and
a group identifier;
identify a plurality of users by:
determining, based on device information corresponding to the client device, a first user identifier; and
determining, based on the group identifier, one or more second user identifiers;
retrieve, based on the plurality of identifiers, spending habit data for each of the plurality of users;
predict, based on the spending habit data for each of the plurality of users, one or more preferences, of the plurality of users, associated with purchasing good or services;
generate, based on the one or more search terms, a list of merchants;
modify, based on the one or more preferences of the plurality of users, the list of merchants;
for at least one merchant of the list of merchants, provide, as input to the trained machine learning model, the spending habit data for each of the plurality of users;
generate a customized group price indicator for the at least one merchant based on outputs of the machine learning model; and
cause display of the customized group price indicator for the at least one merchant.

9. The computing device of claim 8, wherein the instructions, when executed by the one or more processors, further cause the computing device to:
generate, for the at least one merchant, an average cost of items that match the one or more preferences, wherein the average cost of items that match the one or more preferences is provided as input to the machine learning model.

10. The computing device of claim 1, wherein the at least one merchant is a restaurant, wherein the one or more preferences comprise a dietary preference, and wherein the instructions, when executed by the one or more processors, further cause the computing device to:
determine that the at least one merchant is compatible with the dietary preference, wherein the instructions, when executed by the one or more processors, further cause the computing device to modify the list of merchants based on the determining.

11. The computing device of claim 8, wherein the at least one merchant is a restaurant, wherein the one or more preferences comprise a favorite item, and wherein the instructions, when executed by the one or more processors, further cause the computing device to:
determine that a menu of the at least one merchant includes the favorite item, wherein the instructions, when executed by the one or more processors, further cause the computing device to modify the list of merchants based on the determining.

12. The computing device of claim 8, wherein the instructions, when executed by the one or more processors, further cause the computing device to modify the list of merchants by filtering the list of merchants by removing merchants that do not match the one or more preferences of the plurality of users.

13. The computing device of claim 8, wherein the instructions, when executed by the one or more processors, further cause the computing device to modify the list of merchants by ranking the list of merchants based on the one or more preferences of the plurality of users.

14. The computing device of claim 8, wherein the instructions, when executed by the one or more processors, further cause the computing device to:
generate an indication that the at least one merchant is compatible with the one or more preferences of the plurality of users; and
cause display of the generated indication.

15. One or more non-transitory computer-readable media storing instructions that, when executed by one or more processors of a computing device, cause the computing device to:
train, using training data comprising historical user transaction data that indicates amounts spent by each of a plurality of users when purchasing items of one or more item types, a machine learning model, implemented via a plurality of connected nodes that are part of a plurality of layers of an artificial neural network, to output, based on input data provided to an input layer of the artificial neural network and via an output layer of the artificial neural network, customized price indicators based on a spending activity for one or more users by adjusting, based on at least a portion of the training data, one or more machine learning model parameters associated with at least one connected node of the plurality of connected nodes,
receive, from a client device, a query comprising:
one or more search terms; and
a group identifier;
identify a plurality of users by:
determining, based on device information corresponding to the client device, a first user identifier; and
determining, based on the group identifier, one or more second user identifiers;
retrieve, based on the plurality of identifiers, spending habit data for each of the plurality of users;
predict, based on the spending habit data for each of the plurality of users, one or more preferences, of the plurality of users, associated with purchasing good or services;
generate, based on the one or more search terms, a list of merchants;
modify, based on the one or more preferences of the plurality of users, the list of merchants;
for at least one merchant of the list of merchants, provide, as input to the trained machine learning model, the spending habit data for each of the plurality of users;
generate a customized group price indicator for the at least one merchant based on outputs of the machine learning model; and
cause display of the customized group price indicator for the at least one merchant.

16. The non-transitory computer-readable media of claim 15, wherein the instructions, when executed by the one or more processors, further cause the computing device to:
generate, for the at least one merchant, an average cost of items that match the one or more preferences, wherein the average cost of items that match the one or more preferences is provided as input to the machine learning model.

17. The non-transitory computer-readable media of claim 15, wherein the at least one merchant is a restaurant, wherein the one or more preferences comprise a dietary preference, and wherein the instructions, when executed by the one or more processors, further cause the computing device to:
determine that the at least one merchant is compatible with the dietary preference, wherein the instructions, when executed by the one or more processors, further cause the computing device to modify the list of merchants based on the determining.

18. The non-transitory computer-readable media of claim 15, wherein the at least one merchant is a restaurant, wherein the one or more preferences comprise a favorite item, and wherein the instructions, when executed by the one or more processors, further cause the computing device to:
determine that a menu of the at least one merchant includes the favorite item, wherein the instructions, when executed by the one or more processors, further cause the computing device to modify the list of merchants based on the determining.

19. The non-transitory computer-readable media of claim 15, wherein the instructions, when executed by the one or more processors, further cause the computing device to modify the list of merchants by filtering the list of merchants by removing merchants that do not match the one or more preferences of the plurality of users.

20. The non-transitory computer-readable media of claim 15, wherein the instructions, when executed by the one or more processors, further cause the computing device to modify the list of merchants by ranking the list of merchants based on the one or more preferences of the plurality of users.

* * * * *